United States Patent
Yilmaz et al.

(10) Patent No.: US 11,297,546 B2
(45) Date of Patent: Apr. 5, 2022

(54) NEIGHBORING MOBILITY REFERENCE SIGNAL SET SEARCH IN BEAM-BASED NR MOBILITY

(71) Applicant: Telefonaktiebolaget LM Ericsson (publ), Stockholm (SE)

(72) Inventors: Osman Nuri Can Yilmaz, Espoo (FI); Andres Reial, Malmö (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 16/347,282

(22) PCT Filed: Oct. 30, 2017

(86) PCT No.: PCT/IB2017/056744
§ 371 (c)(1),
(2) Date: May 3, 2019

(87) PCT Pub. No.: WO2018/083585
PCT Pub. Date: May 11, 2018

(65) Prior Publication Data
US 2019/0281510 A1     Sep. 12, 2019

Related U.S. Application Data

(60) Provisional application No. 62/417,439, filed on Nov. 4, 2016.

(51) Int. Cl.
*H04W 36/00* (2009.01)
*H04L 5/00* (2006.01)
*H04W 48/16* (2009.01)

(52) U.S. Cl.
CPC ........ *H04W 36/0058* (2018.08); *H04L 5/0053* (2013.01); *H04W 36/0085* (2018.08); *H04W 36/00835* (2018.08); *H04W 48/16* (2013.01)

(58) Field of Classification Search
CPC ..... H04W 48/16; H04W 48/20; H04W 48/08; H04W 48/00; H04W 48/04;
(Continued)

(56) References Cited

U.S. PATENT DOCUMENTS 10,327,154 B2 * 6/2019 Nagaraja ............. H04B 7/0628
2014/0341048 A1 * 11/2014 Sajadieh ............. H04L 5/0085
370/252
(Continued)

FOREIGN PATENT DOCUMENTS

WO     WO 2015/115376 A1     6/2015
WO     2016 095984 A1     6/2016
(Continued)

OTHER PUBLICATIONS

3GPP TSG RAN WG1 Meeting #86bis; Lisbon, Portugal; Source: CMCC; Title: On multi-beam-based mobility management (R1-1609310)—Oct. 10-14, 2016.
(Continued)

*Primary Examiner* — Phong La
(74) *Attorney, Agent, or Firm* — Baker Botts, LLP

(57) ABSTRACT

According to certain embodiments, a method in a wireless device (110) for performing mobility measurements includes detecting (402) a first mobility measurement signal component sent from a network node (100), the first mobility measurement signal comprising a group ID information. The method may further include determining (404) one or more of a beam ID range and a resource allocation range for a second mobility measurement signal component using the group ID information. And, the method may further include detecting (406) the second mobility measurement signal component using the one or more of the beam ID range and the resource allocation range.

23 Claims, 8 Drawing Sheets

(58) Field of Classification Search
CPC ......... H04W 36/0058; H04W 36/0053; H04W 36/0061; H04W 36/0072; H04W 36/0077; H04W 36/0055; H04W 36/00835; H04L 5/0053
USPC .......................................................... 370/331
See application file for complete search history.

(56) References Cited

U.S. PATENT DOCUMENTS

| | | | |
|---|---|---|---|
| 2016/0373178 A1* | 12/2016 | Nam | H04B 7/0469 |
| 2017/0111886 A1* | 4/2017 | Kim | H04W 48/14 |
| 2017/0135029 A1* | 5/2017 | Chendamarai Kannan | H04L 5/005 |
| 2017/0142604 A1* | 5/2017 | Reial | H04W 72/042 |
| 2017/0331577 A1* | 11/2017 | Parkvall | H04W 4/00 |
| 2017/0359791 A1* | 12/2017 | Onggosanusi | H04L 5/0094 |
| 2017/0367075 A1* | 12/2017 | Liu | H04W 72/04 |
| 2018/0048413 A1* | 2/2018 | Liu | H04W 48/18 |
| 2018/0083680 A1* | 3/2018 | Guo | H04B 7/0626 |
| 2018/0115355 A1* | 4/2018 | Nagata | H04B 7/0621 |
| 2018/0359790 A1* | 12/2018 | Ingale | H04W 28/16 |
| 2019/0007906 A1* | 1/2019 | Hessler | H04W 52/0245 |
| 2019/0182007 A1* | 6/2019 | Liu | H04L 5/005 |
| 2019/0223043 A1* | 7/2019 | Geng | H04L 5/0051 |

FOREIGN PATENT DOCUMENTS

| | | |
|---|---|---|
| WO | 2016 127369 A1 | 8/2016 |
| WO | WO 2017/136732 A1 | 10/2017 |

OTHER PUBLICATIONS

3GPP TSG-RAN WG1 Meeting #86bis; Lisbon, Portugal; Source: Ericsson; Title: On NR DL mobility measurement signal design (R1-1609675)—October 10-14, 2016.
3GPP TSG-RAN WG2 #95bis; Kaohsiung, Taiwan; Source: Ericsson: Title: RRM measurements and mobility control in RRC Connected (R2-166932)—Oct. 10-14, 2016.
PCT International Search Report for International application No. PCT/IB2017/056744—dated Jan. 31, 2018.
PCT Written Opinion of the International Searching Authority for International application No. PCT/IB2017/056744—dated Jan. 31, 2018.
P137271EPPC; Summons to attend oral proceedings pursuant to Rule 115(1) EPC).

* cited by examiner

NEIGHBORING MOBILITY REFERENCE SIGNAL SET SEARCH IN BEAM-BASED NR MOBILITY

PRIORITY

This nonprovisional application is a U.S. National Stage Filing under 35 U.S.C. § 371 of International Patent Application Serial No. PCT/IB2017/056744 filed Oct. 30, 2017 and entitled "Neighboring Mobility Reference Signal Set Search in Beambased NR Mobility" which claims priority to U.S. Provisional Patent Application No. 62/417,439 filed Nov. 4, 2016 both of which are hereby incorporated by reference in their entirety.

TECHNICAL FIELD

The present disclosure relates, in general, to wireless communications and, more specifically, to mobility reference signals for beam-based mobility.

BACKGROUND

Overall requirements for the Next Generation (NG) architecture (see, e.g., TR 23.799, Study on Architecture for Next Generation) and, more specifically, the NG Access Technology (see, e.g., TR 38.913, Study on Scenarios and Requirements for Next Generation Access Technologies) will impact the design of the Active Mode Mobility solutions for the new RAT (NR) (see, e.g., RP-160671, New SID Proposal: Study on New Radio Access Technology, DoCoMo) compared to the current mobility solution in LTE. Some of these requirements include the need to support network energy efficiency mechanisms, provide "future-proofness," and support a very wide range of frequencies (up to 100 GHz).

Neighbor Cell/Beam Search and Detection Procedures

In LTE, a user equipment (UE) detects cells based on their primary synchronization signal (PSS) and secondary synchronization signal (SSS). An important property of these signals is that a neighbor cell does not need to be in-sync with the serving cell's signals in order to detect them. The UE autonomously detects the neighbor cell IDs (e.g., a physical cell identifier (PCI)) from an acquired PSS/SSS, that is, the network does not need to provide a neighbor cell list. UEs typically detect and measure neighbor cells by sampling a short time window (e.g., 5 ms) on the target frequency (which may be the same or different from serving) and search (possibly offline) for PSS/SSS occurrences within that sample. For each detected PSS/SSS, the UE can also perform a signal quality measurement using the cell-specific reference signal (CRS) corresponding to the PCI. The result of that action is a list of neighbor cell IDs and corresponding measurement sample.

In new radio (NR), a UE in CONNECTED state should rely as much as possible on UE-specific beamforming. Since data and control channels are beamformed, reference signals should also be beamformed, so that the measurements reflect the quality that the UE would experience during data transmission. Similar beamforming properties of the reference signals and the data transmission also ensure that both signals are in the UE's dynamic range so that both remain detectable/decodable.

The Reference Signals that can be used to support Radio Resource Control (RRC)-driven mobility may include:

1. In connected active, use non-UE specific reference signal (RS) for measurements. The UE may not need to be aware whether the RS is UE-specific or non-UE specific);
2. The non-UE specific RS can be found by the UE without additional configuration; and
3. The non-UE specific RS encodes an identity.

The UE may be configured with a set of mobility reference signals (MRSs) via L3 signaling. The beam-switching procedure can be handled by L1/L2 within the configured MRS set. However, when it comes to the beam-switching procedure from the configured MRS set to a non-configured MRS(s), there should be a procedure prior to the L3 procedure to handle the beam-switching. There are several options for solving this issue. A first option includes having the network take a proactive approach by configuring the UE with a new set of MRSs by L3 signaling. A second option is for the UE to detect a new MRS and report it to the network by L3 signaling. However, each solution has a number of technical problems.

In the first option, the MRS search, L3 processing, and signaling, all together may take time and cause connection drops when UE is at the coverage-edge e.g., cell-edge-beam. If the procedure is done earlier than the cell-edge-beam, it may cause unnecessary signaling as the UE may not necessarily be doing a beam-switching/handover soon. In the second option, it may take time for UE to find a neighboring MRS fast enough, because the target MRS set may not be clearly known on the UE side, or the full search space may be excessively large.

SUMMARY

To address the foregoing problems, disclosed is a method in a network node for transmitting mobility measurement signals. The method includes transmitting, to a wireless device, a first mobility measurement signal component comprising a group ID information for a mobility measurement signal group. The method further includes transmitting, to the wireless device, one or more second mobility measurement signal components comprising measurement features and beam ID information for beams belonging to the mobility measurement signal group.

In certain embodiments, the first mobility measurement signal component is a synchronization signal block (SSB) comprising a primary synchronization signal (PSS) and a secondary synchronization signal (SSS). In certain embodiments, the one or more second mobility measurement signal components comprises a channel state information reference signal (CSI-RS).

In some embodiments, the first mobility measurement signal component is common to multiple mobility reference signals (MRSs). In some embodiments, the group ID information is a cell identifier. In some embodiments, the group ID information is a physical cell identifier (PCI). In certain embodiments, the measurement features comprise resource elements (RE) that are operable to be measured by the wireless device.

In certain embodiments, the method further includes receiving, from the wireless device, an identification of at least one MRS set and configuring the wireless device using the at least one MRS set.

Also disclosed is a method in a wireless device for performing mobility measurements. The method includes detecting a first mobility measurement signal component sent from a network node, the first mobility measurement signal comprising a group ID information. The method includes determining one or more of a beam ID range and a resource allocation range for a second mobility measurement signal component using the group ID information. And the method includes detecting the second mobility measurement signal component using the one or more of the beam ID range and the resource allocation range.

According to certain embodiments, the first mobility measurement signal component is a synchronization signal block comprising a primary synchronization signal and a secondary synchronization signal. In certain embodiments, the second mobility measurement signal component comprises a channel state information reference signal.

In some embodiments, the first mobility measurement signal component is common to multiple mobility reference signals. In some embodiments, the group ID information comprises a cell identifier. In some embodiments, the group ID information comprises a physical cell identifier. In some embodiments, the first mobility measurement signal component comprises time and frequency synchronization information.

In certain embodiments, the method further comprises performing a beam quality measurement on the CSI-RS and transmitting the beam quality measurement to the network node.

In certain embodiments, the method further includes transmitting to the network node an identification of at least one MRS set and receiving one or more configuration signals from the network node, the configuration signals based on the at least one MRS set.

Further disclosed is a network node for transmitting mobility measurement signals. The network node comprises an interface that is configured to transmit, to a wireless device, a first mobility measurement signal component comprising a group ID information for a mobility measurement signal group and transmit, to the wireless device, one or more second mobility measurement signal components comprising measurement features and beam ID information for beams belonging to the mobility measurement signal group.

In some embodiments, the first mobility measurement signal component is a synchronization signal block comprising a primary synchronization signal and a secondary synchronization signal. In some embodiments, the one or more second mobility measurement signal components comprise a channel state information reference signal.

In certain embodiments, the first mobility measurement signal component is common to multiple mobility reference signals. In certain embodiments, the group ID information is a cell identifier. In certain embodiments, the group ID information is a physical cell identifier. In some embodiments, the measurement features comprise resource elements (RE) that are operable to be measured by the wireless device.

In some embodiments, the interface of the network node is further configured to receive, from the wireless device, an identification of at least one MRS set and configure the wireless device using the at least one MRS set.

Also disclosed, is a wireless device for performing mobility measurements. The wireless device comprising an interface operably coupled to processing circuitry. The interface is configured to detect a first mobility measurement signal component sent from a network node, the first mobility measurement signal comprising a group ID information. The processing circuitry is configured to determine one or more of a beam ID range and a resource allocation range for a second mobility measurement signal component using the group ID information. The interface is further configured to detect the second mobility measurement signal component using the one or more of the beam ID range and the resource allocation range.

In some embodiments, the first mobility measurement signal component is a synchronization signal block comprising a primary synchronization signal and a secondary synchronization signal. In certain embodiments, the second mobility measurement signal component comprises a channel state information reference signal. In some embodiments, the first mobility measurement signal component is common to multiple mobility reference signals. In some embodiments, the group ID information comprises a cell identifier. In some embodiments, the group ID information comprises a physical cell identifier. In some embodiments, the first mobility measurement signal component comprises time and frequency synchronization information.

In certain embodiments, the processing circuitry of the wireless device is further configured to perform a beam quality measurement on the CSI-RS and the interface is further configured to transmit the beam quality measurement to the network node.

In certain embodiments, the interface of the wireless device is further configured to transmit to the network node an identification of at least one MRS set and receive one or more configuration signals from the network node, the configuration signals based on the at least one MRS set.

Certain embodiments of the present disclosure may provide one or more technical advantages. For example, certain embodiments may minimize beam-switching delays. Additionally, particular embodiments may minimize potential beam-switching failures. Particular embodiments may also provide a simplification of MRS planning. The cost of signaling, delay, and planning may thus be minimized. In some embodiments, the disclosed MRS is designed so that the UE need not be configured with the cell or beam group ID and the beam ID to measure, but can detect them easily from the received MRS itself. This structure of the MRS allows for limited complexity in the detection of the cell/group ID. Reducing complexity minimizes the beam-switching delay and other potential failures. Other advantages may be readily available to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

As explained above, there are a number of technical problems associated with mobility reference signals (MRSs) for beam-based mobility. For example, when a network proactively configures a UE with a new set of mobility reference signals (MRSs) using L3 signaling, the MRS search, L3 processing, and signaling may lead to dropped connections if the UE is at a coverage-edge. If a UE is used to detect a new MRS and report it to the network using L3 signaling, the time it takes for the UE to find a neighboring MRS may be too long, or the related energy consumption too high.

To overcome these and other issues, certain embodiments of the present disclosure provide a novel mobility reference signal and search procedure that minimizes the cost of signaling, delay, and planning for beam switching. Certain embodiments disclose two or more signal components that allow for more efficient beam switching. Utilizing a plurality of signal components to coordinate beam switching provides a number of technical advantages not realized by current systems. In some embodiments, the disclosed signals are designed so that the UE need not be configured with the cell or beam group ID and the beam ID to measure, but can detect them easily from the received signals themselves. This structure of the signals allows for limited complexity in the detection of the cell/group ID. Accordingly, certain embodiments may advantageously allow for a reduced beam-switching delays and associated beam-switching failures. FIGS. 1-8 provide additional details for mobility reference signals in the case of beam-based mobility that may provide these and other advantages.

Figure 1:
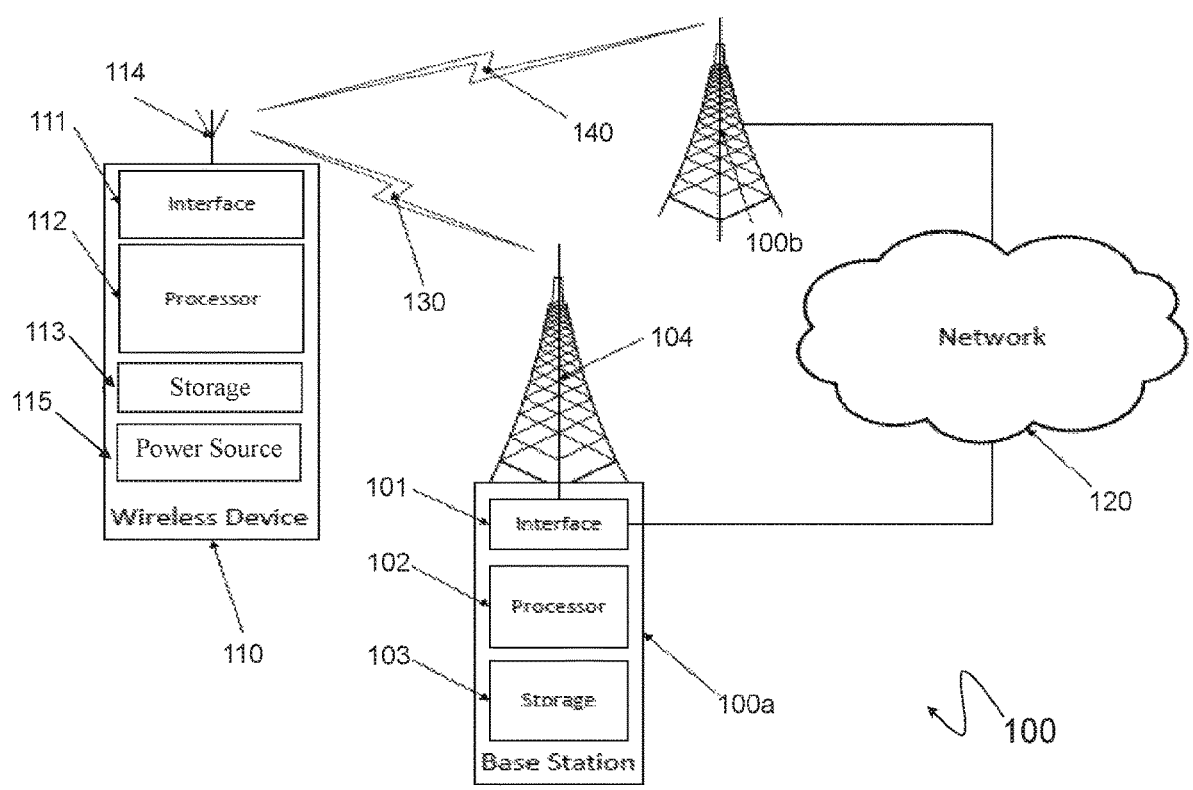
FIG. 1 is a schematic diagram of a wireless communication network, in accordance with certain embodiments.

FIG. 1 is a schematic diagram of a wireless communication network 100, in accordance with certain embodiments. In the illustrated embodiment, FIG. 1 includes network 120, network nodes 100*a-b* (network node 100*a* may be referenced generally as "network node 100"), and wireless device 110. Wireless device 110 may be interchangeably referred to as user equipment (UE) 110. In different embodiments, the wireless network may comprise any number of wired or wireless networks, network nodes, base stations (BS), controllers, wireless devices, relay stations, and/or any other components that may facilitate or participate in the communication of data and/or signals whether via wired or wireless connections.

Network 120 may comprise one or more IP networks, public switched telephone networks (PSTNs), packet data networks, optical networks, wide area networks (WANs), local area networks (LANs), wireless local area networks (WLANs), wired networks, wireless networks, metropolitan area networks, and other networks to enable communication between devices.

Network node 100 may refer to any kind of network node 100, which may comprise a Node B, base station (BS), radio base station, multi-standard radio (MSR) radio node such as MSR BS, eNode B, gNode B, network controller, radio network controller (RNC), multi-cell/multicast coordination entity (MCE), base station controller (BSC), relay node, base transceiver station (BTS), access point (AP), radio access point, transmission points, transmission nodes, remote radio unit (RRU), remote radio head (RRH), nodes in distributed antenna system (DAS), core network node (e.g., MSC, MME, SON node, coordinating node, etc.), O&M, OSS, positioning node (e.g., E-SMLC), MDT, an external node (e.g., third-party node, a node external to the current network), or any suitable network node.

Network node 100 comprises interface 101, processor 102, storage 103, and antenna 104. These components are depicted as single boxes located within a single larger box. In practice however, a network node 100 may comprise multiple different physical components that make up a single illustrated component (e.g., interface 101 may comprise terminals for coupling wires for a wired connection and a radio transceiver for a wireless connection). As another example, network node 100 may be a virtual network node in which multiple different physically separate components interact to provide the functionality of network node 100 (e.g., processor 102 may comprise three separate processors located in three separate enclosures, where each processor is responsible for a different function for a particular instance of network node 100). Similarly, network node 100 may be composed of multiple physically separate components (e.g., a NodeB component and a RNC component, a BTS component and a BSC component, etc.), which may each have their own respective processor, storage, and interface components. In certain scenarios in which network node 100 comprises multiple separate components (e.g., BTS and BSC components), one or more of the separate components may be shared among several network nodes. For example, a single RNC may control multiple NodeB's. In such a scenario, each unique NodeB and BSC pair, may be a separate network node. In some embodiments, network node 100 may be configured to support multiple radio access technologies (RATs). In such embodiments, some components may be duplicated (e.g., separate storage 103 for the different RATs) and some components may be reused (e.g., the same antenna 104 may be shared by the RATs).

Processor 102 may be a combination of one or more of a microprocessor, controller, microcontroller, central processing unit, digital signal processor, application specific integrated circuit, field programmable gate array, processing circuitry, or any other suitable computing device, resource, or combination of hardware, software and/or encoded logic operable to provide, either alone or in conjunction with other network node 100 components, such as storage 103, network node 100 functionality. For example, processor 102 may execute instructions stored in storage 103. Such functionality may include providing various wireless features discussed herein to a wireless devices, such as wireless device 110, including any of the features or benefits disclosed herein.

Storage 103 may comprise any form of volatile or non-volatile computer readable memory including, without limitation, persistent storage, solid state memory, remotely mounted memory, magnetic media, optical media, random access memory (RAM), read-only memory (ROM), removable media, or any other suitable local or remote memory component. Storage 103 may store any suitable instructions, data or information, including software and encoded logic, utilized by network node 100. Storage 103 may be used to store any calculations made by processor 102 and/or any data received via interface 101.

Network node 100 also comprises interface 101, which may be used in the wired or wireless communication of signalling and/or data between network node 100, network 120, and/or wireless device 110. For example, interface 101 may perform any formatting, coding, or translating that may be needed to allow network node 100 to send and receive data from network 120 over a wired connection. Interface 101 may also include a radio transmitter and/or receiver that may be coupled to or a part of antenna 104. The radio may receive digital data that is to be sent out to other network nodes or wireless devices 110 via a wireless connection. The radio may convert the digital data into a radio signal having the appropriate channel and bandwidth parameters. The radio signal may then be transmitted via antenna 104 to the appropriate recipient (e.g., wireless device 110).

Antenna 104 may be any type of antenna capable of transmitting and receiving data and/or signals wirelessly. In some embodiments, antenna 104 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line.

Wireless device 110 may be any type of wireless endpoint, mobile station, mobile phone, wireless local loop phone, smartphone, user equipment (UE), desktop computer, PDA, cell phone, tablet, laptop, VoIP phone or handset, which is able to wirelessly send and receive data and/or signals to and from a network node, such as network node 100 and/or other wireless devices 110. For example, wireless device 110 may transmit wireless signals to one or more of network nodes 100a-b, and/or receive wireless signals from one or more of network nodes 100a-b. The wireless signals may contain voice traffic, data traffic, control signals, and/or any other suitable information. In some embodiments, an area of wireless signal coverage associated with a network node 100 may be referred to as a cell. In some embodiments, wireless device 110 may have device-to-device (D2D) capability. Thus, wireless device 110 may be able to receive signals from and/or transmit signals directly to another wireless device. Wireless device 110 comprises interface 111, processor 112, storage 113, antenna 114, and power source 115. Like network node 100, the components of wireless device 110 are depicted as single boxes located within a single larger box, however in practice a wireless device may comprises multiple different physical components that make up a single illustrated component (e.g., storage 113 may comprise multiple discrete microchips, each microchip representing a portion of the total storage capacity).

Interface 111 may be used in the wireless communication of signalling and/or data between wireless device 110 and network node 100. For example, interface 111 may perform any formatting, coding, or translating that may be needed to allow wireless device 110 to send and receive data from network node 100 over a wireless connection. Interface 111 may also include a radio transmitter and/or receiver that may be coupled to or a part of antenna 114. The radio may receive digital data that is to be sent out to network node 100 via a wireless connection. The radio may convert the digital data into a radio signal having the appropriate channel and bandwidth parameters. The radio signal may then be transmitted via antenna 114 to network node 100.

Processor 112 may be a combination of one or more of a microprocessor, controller, microcontroller, central processing unit, digital signal processor, application specific integrated circuit, field programmable gate array, processing circuitry, or any other suitable computing device, resource, or combination of hardware, software and/or encoded logic operable to provide, either alone or in combination with other wireless device 110 components, such as storage 113, wireless device 110 functionality. Such functionality may include providing various wireless features discussed herein, including any of the features or benefits disclosed herein.

Storage 113 may be any form of volatile or non-volatile memory including, without limitation, persistent storage, solid state memory, remotely mounted memory, magnetic media, optical media, random access memory (RAM), read-only memory (ROM), removable media, or any other suitable local or remote memory component. Storage 113 may store any suitable data, instructions, or information, including software and encoded logic, utilized by wireless device 110. Storage 113 may be used to store any calculations made by processor 112 and/or any data received via interface 111.

Antenna 114 may be any type of antenna capable of transmitting and receiving data and/or signals wirelessly. In some embodiments, antenna 114 may comprise one or more omni-directional, sector or panel antennas operable to transmit/receive radio signals between 2 GHz and 66 GHz. For simplicity, antenna 114 may be considered a part of interface 111 to the extent that a wireless signal is being used.

Power source 115 may comprise power management circuitry. Power source 115 may receive power from a power supply, which may either be comprised in, or be external to, power source 115. For example, wireless device 110 may comprise a power supply in the form of a battery or battery pack, which is connected to, or integrated in, power source 115. Other types of power sources, such as photovoltaic devices, may also be used. As a further example, wireless device 110 may be connectable to an external power supply (such as an electricity outlet) via an input circuitry or interface such as an electrical cable, whereby the external power supply supplies power to power source 115. Power source 115 may be electrically coupled to interface 111, processor 112, storage 113, and be configured to supply wireless device 110 with power for performing the functionality described herein.

Figure 8:
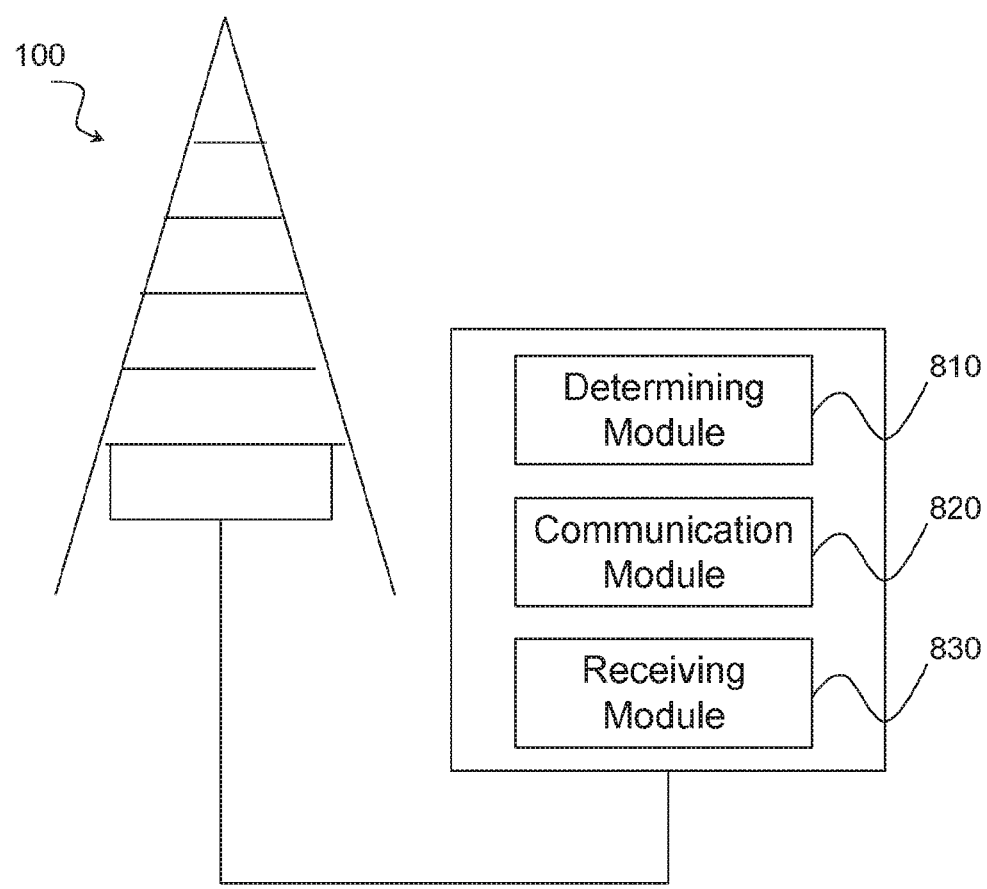
FIG. 8 is a schematic block diagram of an exemplary network node, in accordance with certain embodiments.

In certain embodiments, network nodes 100 may interface with a radio network controller. The radio network controller may control network nodes 100 and may provide certain radio resource management functions, mobility management functions, and/or other suitable functions. In certain embodiments, the functions of the radio network controller may be performed by network node 100. The radio network controller may interface with a core network node. In certain embodiments, the radio network controller may interface with the core network node via an interconnecting network. The interconnecting network may refer to any interconnecting system capable of transmitting audio, video, signals, data, messages, or any combination of the preceding. The interconnecting network may include all or a portion of a PSTN, a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof. FIG. 8 describes additional functionality of a radio network controller.

In some embodiments, the core network node may manage the establishment of communication sessions and various other functionalities for wireless device 110. Wireless device 110 may exchange certain signals with the core network node using the non-access stratum (NAS) layer. In non-access stratum signaling, signals between wireless devices 110 and the core network node may be transparently passed through the radio access network. In certain embodiments, network nodes 100 may interface with one or more network nodes over an internode interface. For example, network nodes 100a and 100b may interface over an X2 interface.

Although FIG. 1 illustrates a particular arrangement of a wireless network, the present disclosure contemplates that the various embodiments described herein may be applied to a variety of networks having any suitable configuration. For example, the wireless network may include any suitable number of wireless devices 110 and network nodes 100, as well as any additional elements suitable to support communication between wireless devices or between a wireless device and another communication device (such as a landline telephone). Furthermore, the embodiments may be implemented in any appropriate type of telecommunication system supporting any suitable communication standards and using any suitable components, and are applicable to any RAT or multi-RAT systems in which the wireless device receives and/or transmits signals (e.g., data). For example, the various embodiments described herein may be applicable to NR, 5G, LTE, LTE-Advanced, UMTS, HSPA, GSM, cdma2000, WiMax, WiFi, another suitable radio access technology, or any suitable.

As described above, the present disclosure describes various embodiments that provide for MRSs for beam-based mobility. At a high level, in certain embodiments network node 100 may transmit two or more signals or signal components to wireless device 110. In some embodiments, the first component may identify at least one of an MRS set identifier and/or a search space for an MRS set. In some embodiments, the second component, together with the first component, may identify a beam involved in that MRS set and other features required for detection, such as beam synchronization in time and frequency.

The first signal component may be designed so that it is easier for wireless device 110 to detect compared to the second or subsequent signal components. For example, the first component can be common to multiple MRSs (e.g., a MRS set). The first component may also be repeated by using multiple beam settings to make it easier for wireless device 110 to identify the neighboring access node that wireless device 110 is approaching.

In some embodiments, wireless device 110 can combine those received copies of the first signal component repeated via multiple beams, making it easier to detect those signals. This may be feasible if the first component signature can be kept substantially orthogonal among neighboring MRS sets. Alternatively or additionally, the first signal component can also be transmitted over a wider bandwidth in order to keep the signal more robust against the frequency selective fading and interference. In some embodiments, quicker detection of the first component is made possible by transmitting with a less complex code. The foregoing embodiments are feasible since the second signal component carries the rest of the information regarding the beam synchronization and the rest of the beam ID. Yet, the first component may indicate a relevant set of MRSs, thereby helping the detection of the non-configured neighboring MRS sets and/or a search space of those MRS sets, thereby leading to a faster and more reliable detection.

In certain embodiments, a set of standardized MRS search spaces may be defined based on the first component of MRS. Additionally or alternatively, the search space information can be given by the network via RRC signaling via the serving node (e.g., network node 100) and/or during the initial attach procedure.

To further illustrate embodiments of the present disclosure, non-limiting examples of the first and second signal components are described.

In one embodiment, a MRS comprises two separate signal components. The first signal component may be a synchronization signal block (SSB) transmitted from network node 100. The second signal component may be a beam-specific channel state information reference signal (CSI-RS) signal also transmitted from network node 100.

The SSB may comprise a primary synchronization signal (PSS) and a secondary synchronization signal (SSS). Wireless device 110 may determine a cell ID or physical cell identity (PCI), from the PSS and SSS. In some embodiments, wireless device 110 may determine timing and/or frequency synchronization information from the first signal component. Wireless device 110 may then use the information detected from the first signal component (e.g., timing and frequency information and/or PCI) to detect the CSI-RS signal from the second signal component. For instance, wireless device 110 may determine a cell ID from the first signal component. Wireless device 110 may utilize the cell ID to determine the sequence of the CSI-RS or determine the set of possible sequences or their seeds. The beam ID may be encoded in the CSI-RS resource allocation in time and frequency, e.g. the interleaved comb phase in frequency and the OFDM symbol index used in time, and optionally on the selection of the CSI-RS sequence from the set of possible sequences. In some embodiments, wireless device 100 may perform beam quality measurements on the CSI-RS.

Although the above embodiment is described using a first signal component that comprises a PSS/SSS, certain embodiments may have an alternative signal that has a structure similar to the PSS/SSS and may be used for synchronization and conveying a beam group ID, virtual ID, or other type of grouping ID. However, that ID may not be equal to the cell ID (or PCI) and the first part signal is not transmitted as part of the SSB. In some embodiments, the first and second signal components transmitted by network node 100 may not beamformed the same way and may not be adjacent in time.

As a second illustrative example, in some embodiments the second MRS signal transmitted by network node 100 may still be the CSI-RS as described above. However, the first signal component may no longer be a separate signal, but may be a sync and group ID signal embedded in the CSI-RS symbol, or in close vicinity, and beamformed similarly to the CSI-RS measurement signal. One or more technical advantages may be associated with this second embodiment. For example, this second embodiment may improve the detectability of the first MRS signal in special deployment scenarios. The first part may contain sections that are similar to the PSS and SSS, but frequency-multiplexed into the same symbol.

In a another illustrative embodiment, wireless device 110 may sequentially detect the first and second signal components and, upon detecting the relevant IDs, wireless device 110 may perform measurements and report back to network node 110 referring to the beam IDs detected. For instance, wireless device 110 may first detect the regular PSS/SSS (SSB), obtain the PCI, and then detect CSI-RS using seed(s) that map to the PCI. The serving cell can properly interpret the reported beam IDs via a suitable automatic neighbor relation (ANR) mechanism that informs it about the global cell IDs of the neighbor cell with given PCIs.

Any appropriate steps, methods, or functions may be performed through a computer program product that may, for example, be executed by the components and equipment illustrated in the figure above. For example, storage 103 may comprise non-transitory computer readable means on which a computer program can be stored. The computer program may include instructions which cause processor 102 (and any operatively coupled entities and devices, such as interface 101 and storage 103) to execute methods according to embodiments described herein. The computer program and/or computer program product may thus provide means for performing any steps herein disclosed.

Figure 2:
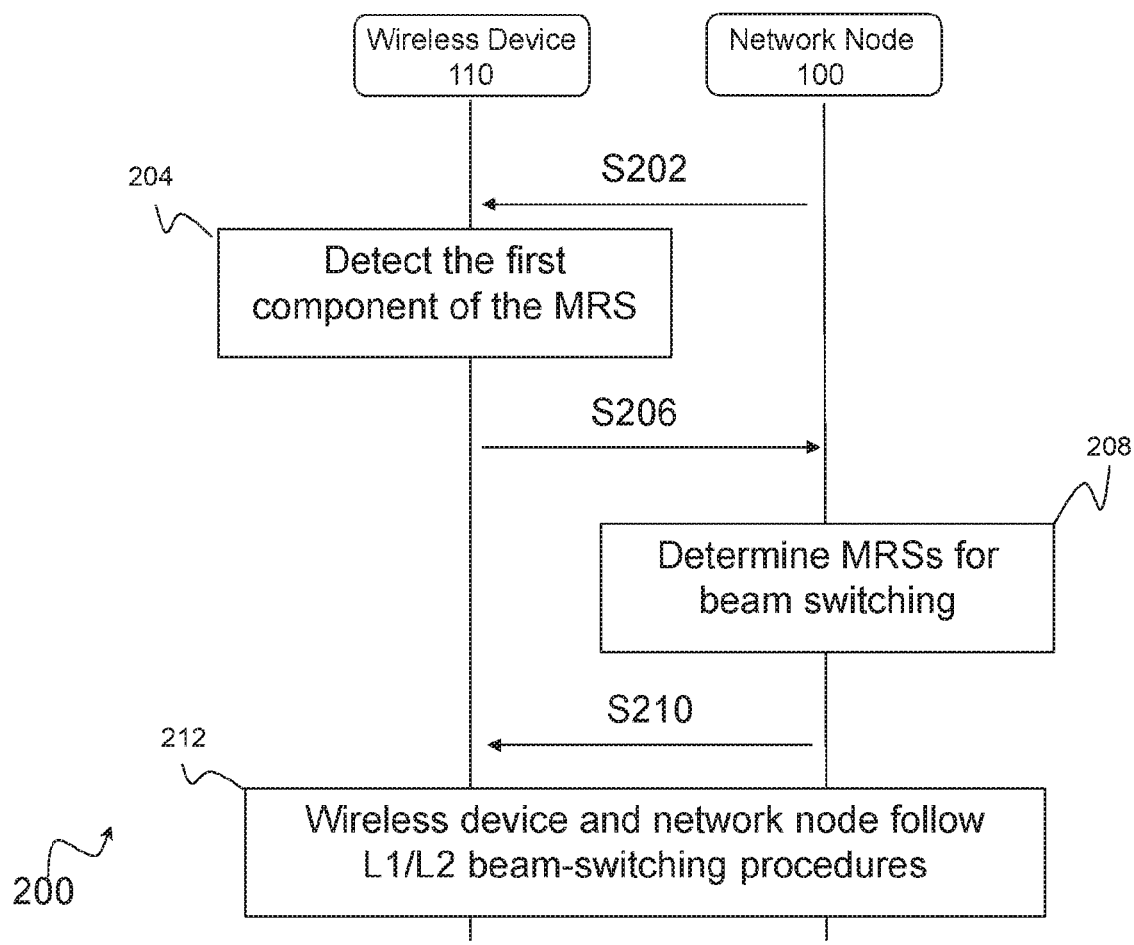
FIG. 2 illustrates a signal flow diagram for using mobility reference signals in beam-based mobility, in accordance with certain embodiments.

FIG. 2 illustrates a signal flow diagram 200 for using mobility reference signals in beam-based mobility, in accordance with certain embodiments. In the illustrated embodiment, network node 100 transmits signal S202 to wireless device 110. Signal S202 represents a first mobility measurement signal component to wireless device 110. The first mobility measurement signal component may comprise a group ID information for a mobility measurement signal group. For example, in some embodiments the first mobility measurement signal component is the SSB. The SSB may contain a PSS and SSS. The group ID may be a cell ID and/or PCI.

At step 204, wireless device 110 may receive signal 202 and detect the first mobility measurement signal component. For instance, wireless device 110 may determine the group ID information for the mobility measurement signal group. Wireless device 110 may also determine a beam ID range and/or a resource allocation range for a second mobility measurement signal component based on the group ID.

Once wireless device 110 detects the first component of the MRS, wireless device 110 may report back to network node 100 the first component information for one or more MRS sets in signal S206. For instance, wireless device 110 may transmit back the search space identifiers and/or an MRS set identifier. The identifier could be similar to the PCI in LTE. In some embodiments, wireless device 110 transmits signal S206 as part of L3 signaling.

At step 208, network node 100 may determine the MRS set for beam switching. Network node 100 may configure wireless device 110 with the MRS set using signal S210. In some embodiments, signal S210 is communicated using L3 signaling. At 212, wireless device 110 and network node 100 follow the L1/L2 beam-switching procedures. In some embodiments, once the UE is configured with the new set(s) of MRSs, the activation and beam-switching decision and relevant procedures may be left transparent to the L3/RRC protocol.

Figure 3:
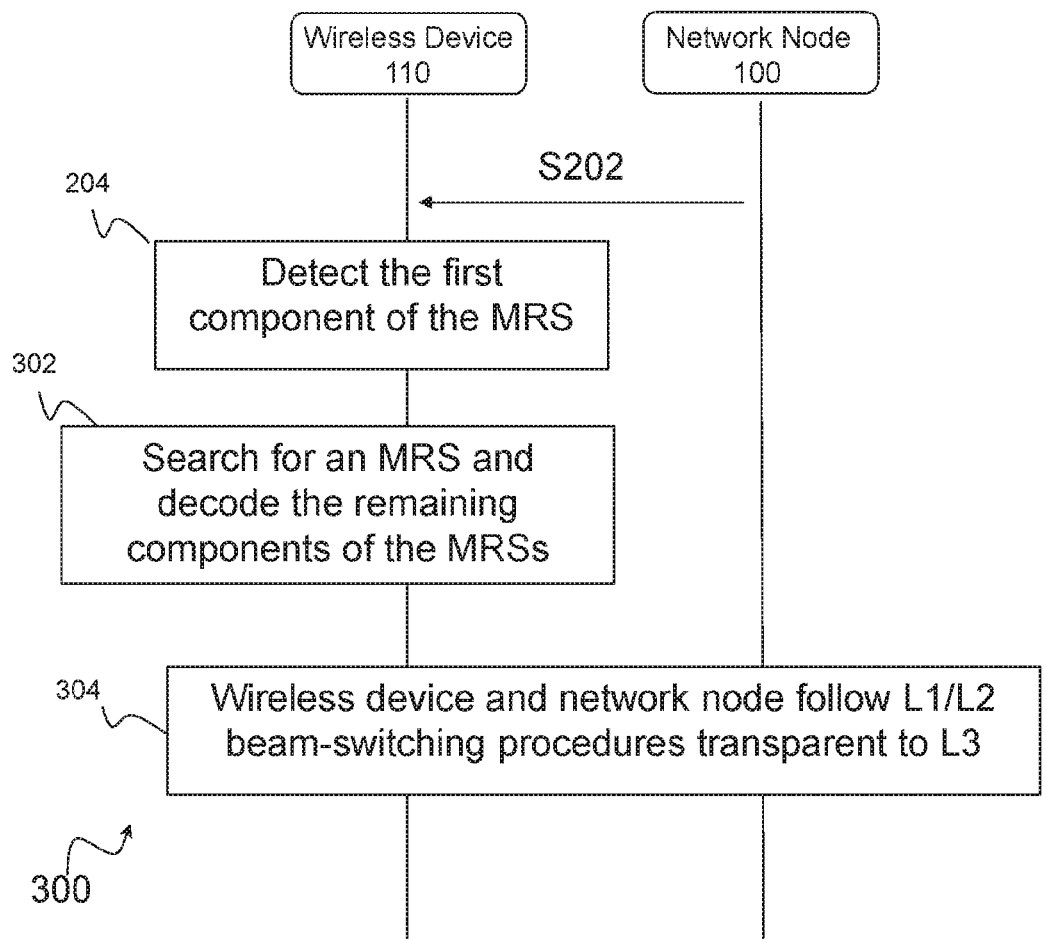
FIG. 3 illustrates a signal flow diagram for using mobility reference signals in beam-based mobility, in accordance with certain embodiments.

FIG. 3 illustrates a signal flow diagram 300 for using mobility reference signals in beam-based mobility, in accordance with certain embodiments. As described above in FIG. 2, in the illustrated embodiment, network node 100 may transmit signal S202 to wireless device 110. Signal S202 represents a first mobility measurement signal component to wireless device 110. The first mobility measurement signal component may comprise a group ID information for a mobility measurement signal group. For example, in some embodiments the first mobility measurement signal component is the SSB. The SSB may contain a PSS and SSS. The group ID may be a cell ID and/or PCI.

At step 204, wireless device 110 may receive signal 202 and detect the first mobility measurement signal component. For instance, wireless device 110 may determine the group ID information for the mobility measurement signal group. Wireless device 110 may also determine a beam ID range and/or a resource allocation range for a second mobility measurement signal component based on the group ID. In some embodiments, wireless device 110 can detect the first mobility measurement signal component of MRSs and identify which search space(s) that the neighboring MRS sets(s) can be found.

At step 302, wireless device 110 may determine a MRS that is associated to those search spaces (if not already the detected one) and start the beam-switching procedure to that one. For instance, wireless device 110 may determine synchronization features and/or a beam ID of the MRSs based on the first signal component.

At step 304, wireless device 110 and network node 100 may begin following the L1/L2 beam switching procedures. In some embodiments, the beam switching procedures are transparent to L3. The beam-switching between beams associated with different MRS sets could be achieved without L3 signaling if the L2 reset or security update is not needed. For example, L3 signaling may not be needed if L3 protocol is located at a centralized or a common node.

Figure 4:
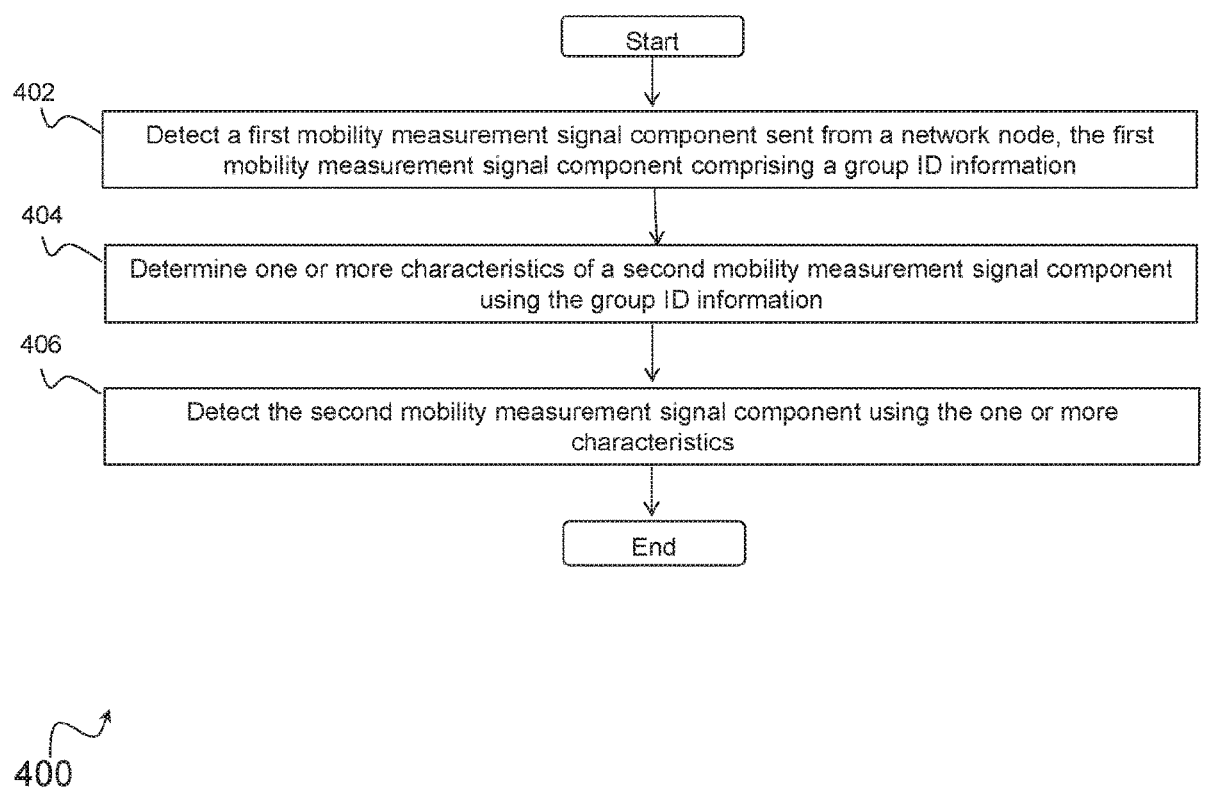
FIG. 4 illustrates a flow chart of a method in a wireless device for mobility reference signals in beam-based mobility, in accordance with certain embodiments.
Figure 5:
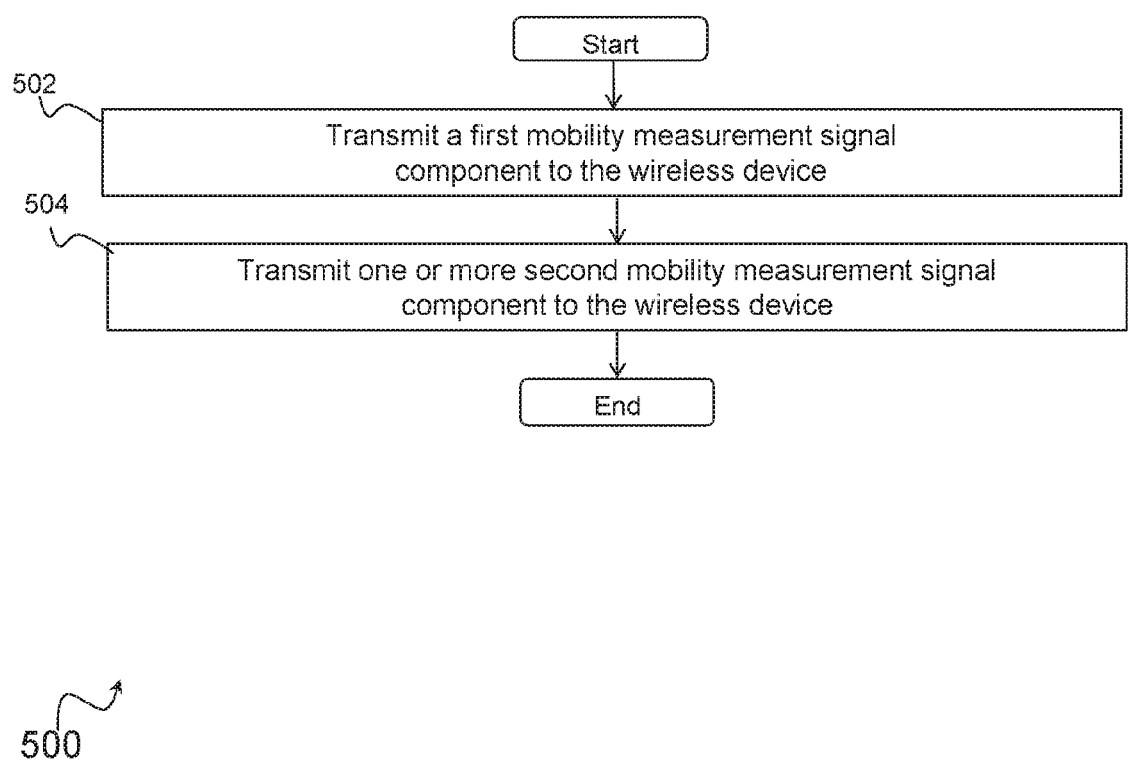
FIG. 5 illustrates a flow chart of a method in a network node for mobility reference signals in beam-based mobility, in accordance with certain embodiments.

FIGS. 2 and 3 are exemplary embodiments. Although these embodiments have been discussed, it will be appreciated that they are not the exclusive embodiments in this disclosure. For instance, in addition to the given embodiments above, the first component of MRS can be utilized for doing an Automatic Neighbor Relation (ANR)-like MRS planning. Embodiments may also simplify the MRS planning as we can do a PCI-like planning, similarly to LTE networks, instead. FIGS. 4 and 5 provide additional examples of embodiments of the present disclosure.

FIG. 4 illustrates a flow chart 400 of a method in wireless device 110 for mobility reference signals in beam-based mobility, in accordance with certain embodiments. At step 402, wireless device 110 may receive/detect a first mobility measurement signal component from network node 100. The first mobility measurement signal component sent from a network node 100 may comprise group ID information. For example, in some embodiments, the group ID information comprises a SSB including a PSS and a SSS. From the PSS/SSS, wireless device 110 may determine a cell ID, PCI, and/or time and frequency synchronization information. In some embodiments, the first mobility measurement signal component is common to multiple MRSs, for example a MRS set, and may be repeated by multiple beams to make detection of the first mobility measurement signal component easier for wireless device 110.

At step 404, wireless device 110 may determine one or more characteristics of a second mobility measurement signal component using the group ID information. For example, the second mobility measurement signal component may comprise a CSI-RS. The CSI-RS may be determined using the information detected in the first mobility measurement signal component, such as the cell ID, PCI, and/or time and frequency synchronization information. In some embodiments, wireless device 110 may determine a beam ID range and/or a resource allocation range for a second mobility measurement signal component using the group ID information.

At step 406, wireless device 110 may detect the second mobility measurement signal component. For example, in some embodiments wireless device 110 may detect the second mobility measurement signal component using the one or more of the beam ID range and the resource allocation range. In some embodiments, wireless device 110 may perform beam quality measurement(s) on the second mobility measurement signal component (e.g., on resource elements of the CSI-RS). In certain embodiments, wireless device 110 may then transmit the beam quality measurement(s) to network node 100.

Various embodiments may perform some, all, or none of the steps described above in FIG. 4. Furthermore, one or more of these steps may be repeated or omitted from the method without deviating from the scope of the disclosure. For example, in some embodiments, the first and second signal components may be communicated as a single signal or group of signals. As another example, in some embodiments, wireless device 110 may communicate an identification of a MRS set to network node 100. Wireless device 110 may then receive one or more configuration signals from network node 100, wherein the configuration signals are based on the MRS set. Although the present disclosure has been described with several embodiments, a myriad of changes, variations, alterations, transformations, and modifications may be suggested to one skilled in the art, and it is intended that the present disclosure encompass such changes, variations, alterations, transformations, and modifications as fall within the scope of the claims.

FIG. 5 illustrates a flow chart 500 of a method in network node 100 for mobility reference signals in beam-based mobility, in accordance with certain embodiments. At step 502, network node 100 transmits a first mobility measurement signal component to wireless device 110. The first mobility measurement signal component may comprise group ID information for a mobility measurement signal group. For example, in some embodiments, the first mobility measurement signal component may be a synchronization signal block (SSB) comprising a primary synchronization signal (PSS) and a secondary synchronization signal (SSS). From the PSS/SSS wireless device 110 may determine a cell ID (or PCI) and/or time and frequency synchronization information. In some embodiments, the first mobility measurement signal component is common to multiple MRSs, for example a MRS set, and may be repeated by multiple beams to make detection of the first mobility measurement signal component easier for wireless device 110.

At step 504, network node 100 may transmit one or more second mobility measurement signal components to wireless device 110. The second mobility measurement signal component(s) may comprise measurements features and/or beam ID information for beams belonging to the mobility measurement signal group. In some embodiments, the second mobility measurement signal component comprises a CSI-RS. In some embodiments, the measurement features comprise resource elements (REs) that are operable to be measured by wireless device 110.

In some embodiments, the first mobility measurement signal component transmitted by network node 100 may allow wireless device 110 to more efficiently detect information to be later transmitted. For example, wireless device 110 may use the information detected from the first signal component (e.g., timing and frequency information and/or PCI) to detect the CSI-RS signal from one or more second signal components. Wireless device 110 may utilize the timing and frequency information obtained from receiving the PSS, SSS, and/or PCI to determine the sequence of the CSI-RS or determine the set of possible sequences or their seeds. Wireless device 100 may also perform beam quality measurements on the measurement features (e.g., the resource elements).

Various embodiments may perform some, all, or none of the steps described above in FIG. 5. Furthermore, one or more of these steps may be repeated or omitted from the method without deviating from the scope of the disclosure. For example, in some embodiments, the first and second signal components may be communicated as a single signal or group of signals. As another example, in some embodiments, network node 100 may receive an identification of an MRS set from wireless device 110. Network node 100 may then configure wireless device 110 using the identified MRS set. Although the present disclosure has been described with several embodiments, a myriad of changes, variations, alterations, transformations, and modifications may be suggested to one skilled in the art, and it is intended that the present disclosure encompass such changes, variations, alterations, transformations, and modifications as fall within the scope of the claims.

Figure 6:
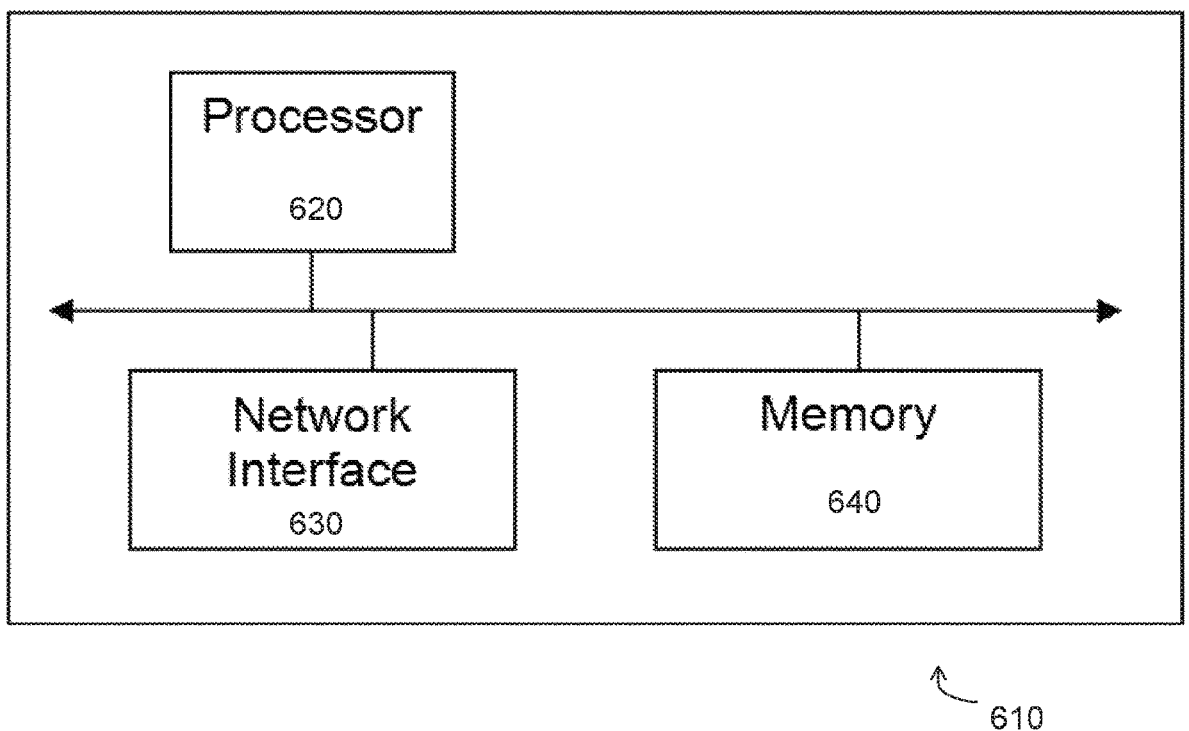
FIG. 6 is a schematic block diagram of an exemplary radio network controller or core network node, in accordance with certain embodiments.

FIG. 6 is a schematic block diagram of an exemplary radio network controller or core network node 610, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller or core network node 610 includes processor 620, memory 630, and network interface 640. In some embodiments, processor 620 executes instructions to provide some or all of the functionality described above as being provided by the network node, memory 630 stores the instructions executed by processor 620, and network interface 640 communicates signals to any suitable node, such as a gateway, switch, router, Internet, Public Switched Telephone Network (PSTN), network nodes 100, radio network controllers or core network nodes 610, etc.

Processor 620 may include any suitable combination of hardware and software implemented in one or more modules to execute instructions and manipulate data to perform some or all of the described functions of the radio network controller or core network node 610. In some embodiments, processor 620 may include, for example, one or more computers, one or more central processing units (CPUs), one or more microprocessors, one or more applications, and/or other logic.

Memory 630 is generally operable to store instructions, such as a computer program, software, an application including one or more of logic, rules, algorithms, code, tables, etc. and/or other instructions capable of being executed by a processor. Examples of memory 630 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 640 is communicatively coupled to processor 620 and may refer to any suitable device operable to receive input for the network node, send output from the network node, perform suitable processing of the input or output or both, communicate to other devices, or any combination of the preceding. Network interface 640 may include appropriate hardware (e.g., port, modem, network interface card, etc.) and software, including protocol conversion and data processing capabilities, to communicate through a network.

Other embodiments of the network node may include additional components beyond those shown in FIG. 6 that may be responsible for providing certain aspects of the network node's functionality, including any of the functionality described above and/or any additional functionality (including any functionality necessary to support the embodiments described above).

Figure 7:
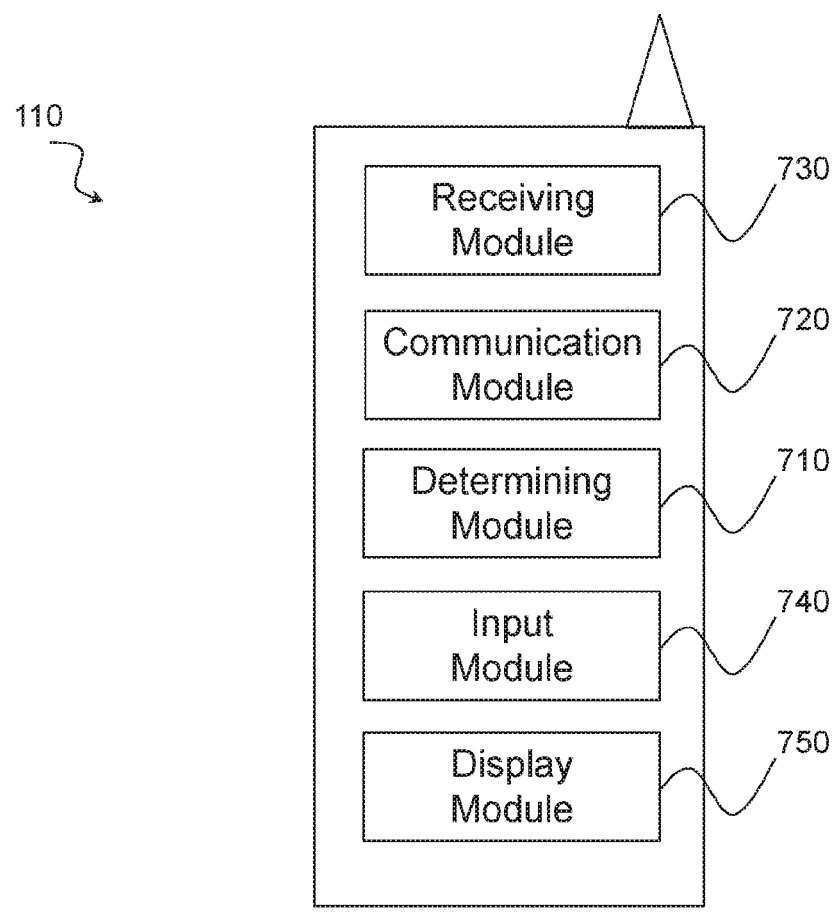
FIG. 7 is a schematic block diagram of an exemplary wireless device, in accordance with certain embodiments.

FIG. 7 is a schematic block diagram of an exemplary wireless device 110, in accordance with certain embodiments. Wireless device 110 may include one or more modules. For example, wireless device 110 may include a determining module 710, a communication module 720, and a receiving module 730. Optionally, wireless device 110 may include an input module 740, a display module 750, and any other suitable modules. Wireless device 110 may perform the selection of a reference TP for RSTD measurements as described above with respect to FIGS. 1-5.

Determining module 710 may perform the processing functions of wireless device 110. In certain embodiments, wireless device 110 may perform any of the functions described above with respect to FIGS. 1-5. In one example embodiment, determining module 710 may determine one or more characteristics of a second mobility measurement signal component using group ID information received in a first mobility measurement signal component. In some embodiments, the one or more determined characteristics include a beam ID range and/or a resource allocation range. In some embodiments, determining module 710 may determine a beam quality measurement. For instance, in embodiments where the second mobility measurement signal component comprises a CSI-RS, determining module 710 may determine a beam quality measurement of the CSI-RS.

Determining module 710 may include or be included in one or more processors, such as processor 112 described above in relation to FIG. 1. Determining module 710 may include analog and/or digital circuitry configured to perform any of the functions of determining module 710 and/or processor 112 described above. The functions of determining module 710 described above may, in certain embodiments, be performed in one or more distinct modules.

Communication module 720 may perform the communication functions of wireless device 110. In certain embodiments, communication module 720 may perform any of the communication functions described above with respect to FIGS. 1-5. In some embodiments, communication module 720 may transmit beam quality measurements to network node 100. In some embodiments, wireless device 110 may transmit an identification of a MRS set(s) to network node 100. As another example, communication module 720 may transmit the signals disclosed in FIGS. 2 and 3 (signal 206 and signals associated with steps 212 and 304).

Communication module 720 may transmit messages to one or more network nodes 100a-b of the wireless network described in FIG. 1. Communication module 720 may include a transmitter and/or a transceiver, such as interface 111 and/or antenna 114 described above in relation to FIG. 1. Communication module 720 may include circuitry configured to wirelessly transmit messages and/or signals. In particular embodiments, communication module 720 may receive messages and/or signals for transmission from determining module 710. In certain embodiments, the functions of communication module 720 described above may be performed in one or more distinct modules.

Receiving module 730 may perform the receiving functions of wireless device 110. In certain embodiments, receiving module 730 may perform any of the receiving functions of wireless device 110 described above with respect to FIGS. 1-5. In one example embodiment, receiving module 730 may receive a first mobility measurement signal component sent from network node 100. The first mobility measurement signal may comprise a group ID information. In some embodiments, the first mobility measurement signal component is a SSB comprising a PSS and a SSS. In some embodiments, the group ID information comprises a cell identifier. In some embodiments, the group ID information comprises a PCI. In some embodiments, the first mobility measurement signal component comprises time and frequency synchronization information. In some embodiments the first mobility measurement signal component is common to a MRS set.

In some embodiments, receiving module 730 may receive a second mobility measurement signal component. In some embodiments, the second mobility measurement signal component comprises a CSI-RS. In some embodiments, receiving module 730 may receive one or more configuration signals from network node 100 for a beam-switching procedure. In some embodiments, the configuration signals received from network node 100 are based on an MRS set identified by wireless device 110.

Receiving module 730 may include a receiver and/or a transceiver, such as interface 111 and/or antenna 114 described above in relation to FIG. 1. Receiving module 730 may include circuitry configured to wirelessly receive messages and/or signals. In particular embodiments, receiving module 730 may communicate received messages and/or signals to determining module 710.

Optionally, wireless device 110 may include input module 740. Input module 740 may receive user input intended for wireless device 110. For example, the input module may receive key presses, button presses, touches, swipes, audio signals, video signals, and/or any other appropriate signals. The input module may include one or more keys, buttons, levers, switches, touchscreens, microphones, and/or cameras. The input module may communicate received signals to determining module 710.

Optionally, wireless device 110 may include display module 750. Display module 750 may present signals on a display of wireless device 110. Display module 750 may include the display and/or any appropriate circuitry and hardware configured to present signals on the display. Display module 750 may receive signals to present on the display from determining module 710.

Determining module 710, communication module 720, receiving module 730, input module 740, and display module 750 may include any suitable configuration of hardware and/or software. Wireless device 110 may include additional modules beyond those shown in FIG. 7 that may be responsible for providing any suitable functionality, including any of the functionality described above and/or any additional functionality (including any functionality necessary to support the various solutions described herein).

FIG. 8 is a block schematic of an exemplary network node 100, in accordance with certain embodiments. Network node 100 may include one or more modules. For example, network node 100 may include determining module 810, communication module 820, receiving module 830, and any other suitable modules. In some embodiments, one or more of determining module 810, communication module 820, receiving module 830, or any other suitable module may be implemented using one or more processors, such as processor 102 described above in relation to FIG. 1. In certain embodiments, the functions of two or more of the various modules may be combined into a single module. Network node 100 may perform one or more steps associated with MRSs for beam-based mobility as described above in reference to FIGS. 1-5.

Determining module 810 may perform the processing functions of network node 100. In certain embodiments, determining module 810 may perform any of the functions of network node described above with respect to FIGS. 1-5. In one example embodiment, determining module 810 may determine one or more beams for configuring wireless device 110 to switch to as part of a beam-switching procedure.

Determining module 810 may include or be included in one or more processors, such as processor 102 described above in relation to FIG. 1. Determining module 810 may include analog and/or digital circuitry configured to perform any of the functions of determining module 810 and/or processor 102 described above. The functions of determining module 810 may, in certain embodiments, be performed in one or more distinct modules. For example, in certain embodiments some of the functionality of determining module 810 may be performed by an allocation module.

Communication module 820 may perform the transmission functions of network node 100. In certain embodiments, network node 100 may perform any of the functions of the node described above with respect to FIGS. 1-5. In one example embodiment, communication module 820 may transmit, to wireless device 110, a first mobility measurement signal component. The first mobility measurement signal component may comprise a group ID information for a mobility measurement signal group. In some embodiments communication module 820 may transmit, to wireless device 110, one or more second mobility measurement signal components comprising measurement features and beam ID information for beams belonging to the mobility measurement signal group.

In some embodiments, the first mobility measurement signal component is a SSB comprising a PSS and a SSS. In certain embodiments, the one or more second mobility measurement signal components comprises CSI-RS. In some embodiments, the first mobility measurement signal component is common to multiple MRSs. The group ID information may comprise a cell identifier, a PCI, and/or time and/or frequency synchronization information.

Communication module 820 may transmit messages to one or more of wireless devices 110. Communication module 820 may include a transmitter and/or a transceiver, such as transceiver 810 described above in relation to FIG. 1. Communication module 820 may include circuitry configured to wirelessly transmit messages and/or signals. In particular embodiments, communication module 820 may receive messages and/or signals for transmission from determining module 810 or any other module.

Receiving module 830 may perform the receiving functions of network node 100. In certain embodiments, receiving module 830 may perform any of the functions of network node 100 described in FIGS. 1-5. In one example embodiment, receiving module 830 may receive beam quality measurement(s) from wireless device 110. Receiving module 830 may receive any suitable information from wireless device 110 Receiving module 830 may include a receiver and/or a transceiver, such as interface 101 and/or antenna 104, which are described above in relation to FIG. 1. Receiving module 830 may include circuitry configured to wirelessly receive messages and/or signals. In particular embodiments, receiving module 830 may communicate received messages and/or signals to determining module 810 or any other suitable module.

Determining module 810, communication module 820, and receiving module 830 may include any suitable configuration of hardware and/or software. Network node 100 may include additional modules beyond those shown in FIG. 8 that may be responsible for providing any suitable functionality, including any of the functionality described above and/or any additional functionality (including any functionality necessary to support the various embodiments described herein).

Modifications, additions, or omissions may be made to the systems and methods described herein without departing from the scope of the disclosure. The methods may include more, fewer, or other steps. Additionally, steps may be performed in any suitable order. Any of the embodiments described in this document may be combined in any way with each other. The term "signalling" used herein may comprise any of: high-layer signalling (e.g., via RRC), lower-layer signalling (e.g., via a physical control channel or a broadcast channel), or a combination thereof. The signalling may be implicit or explicit. The signalling may further be unicast, multicast or broadcast. The signalling may also be directly to another node or via a third node.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

Abbreviations used in the preceding description include:
ANR Automatic Neighbor Relation
AP Access Point
BSC Base Station Controller
BTS Base Transceiver Station
CRS Cell-Specific Reference Signal
CSI-RS Channel State Information Reference Signal
DAS Distributed Antenna System
D2D Device-to-Device
E-SMLC Evolved Serving Mobile Location Center
MCE Multi-Cell/Multicast Coordination Entity
MRS Mobility Reference Signal
MSR Multi-Standard Radio
NG Next Generation
NR New Radio
PCI Physical Cell Identifier
PSS Primary Synchronization Signal
RAT Radio Access Technology
RE Resource Element
RNC Radio Network Controller
RRC Radio Resource Control
RRH Remote Radio Head
RRU Remote Radio Unit
RS Reference Signal
SSS Secondary Synchronization Signal
UE User Equipment

The invention claimed is:
1. A method in a wireless device for performing mobility measurements, the method comprising:
detecting a first mobility measurement signal component sent from a network node, the first mobility measurement signal component comprising a group ID information;
determining one or more of a beam ID range and a resource allocation range for a second mobility measurement signal component using the group ID information;
transmitting to the network node an identification of at least one mobility reference signal (MRS) set;
receiving one or more configuration signals from the network node, the configuration signals based on the at least one MRS set; and detecting the second mobility measurement signal component using the one or more of the beam ID range and the resource allocation range.

2. The method of claim 1, wherein the first mobility measurement signal component is a synchronization signal block (SSB) comprising a primary synchronization signal (PSS) and a secondary synchronization signal (SSS).

3. The method of claim 1, wherein the second mobility measurement signal component comprises a channel state information reference signal (CSI-RS).

4. The method of claim 1, wherein the first mobility measurement signal component is common to multiple mobility reference signals (MRS).

5. The method of claim 1, wherein the group ID information comprises a cell identifier.

6. The method of claim 1, wherein the group ID information comprises a physical cell identifier (PCI).

7. The method of claim 1, wherein the first mobility measurement signal component comprises time and frequency synchronization information.

8. The method of claim 3, further comprising:
performing a beam quality measurement on the CSI-RS; and
transmitting the beam quality measurement to the network node.

9. A network node for transmitting mobility measurement signals, the network node comprising:
an interface configured to:
transmit, to a wireless device, a first mobility measurement signal component comprising a group ID information for a mobility measurement signal group;
receive, from the wireless device, an identification of at least one mobility reference signal (MRS) set;
transmit, to the wireless device, one or more second mobility measurement signal components comprising measurement features and beam ID information for beams belonging to the mobility measurement signal group; and
transmit, to the wireless device one or more configuration signals to configure the wireless device, the configuration signals based on the at least one MRS set.

10. The network node of claim 9, wherein the first mobility measurement signal component is a synchronization signal block (SSB) comprising a primary synchronization signal (PSS) and a secondary synchronization signal (SSS).

11. The network node of claim 9, wherein the one or more second mobility measurement signal components comprises a channel state information reference signal (CSI-RS).

12. The network node of claim 9, wherein the first mobility measurement signal component is common to multiple mobility reference signals (MRSs).

13. The network node of claim 9, wherein the group ID information is a cell identifier.

14. The network node of claim 9, wherein the group ID information is a physical cell identifier (PCI).

15. The network node of claim 9, wherein the measurement features comprise resource elements (RE) that are operable to be measured by the wireless device.

16. A wireless device for performing mobility measurements, the wireless device comprising:
an interface configured to:
detect a first mobility measurement signal component sent from a network node, the first mobility measurement signal component comprising a group ID information;
processing circuitry operably coupled to the interface, the processing circuitry configured to determine one or more of a beam ID range and a resource allocation range for a second mobility measurement signal component using the group ID information;
the interface further configured to:
transmit to the network node an identification of at least one mobility reference signal (MRS) set;
receive one or more configuration signals from the network node, the configuration signals based on the at least one MRS set; and
detect the second mobility measurement signal component using the one or more of the beam ID range and the resource allocation range.

17. The wireless device of claim 16, wherein the first mobility measurement signal component is a synchronization signal block (SSB) comprising a primary synchronization signal (PSS) and a secondary synchronization signal (SSS).

18. The wireless device of claim 16, wherein the second mobility measurement signal component comprises a channel state information reference signal (CSI-RS).

19. The wireless device of claim 16, wherein the first mobility measurement signal component is common to multiple mobility reference signals (MRS).

20. The wireless device of claim 16, wherein the group ID information comprises a cell identifier.

21. The wireless device of claim 16, wherein the group ID information comprises a physical cell identifier (PCI).

22. The wireless device of claim 16, wherein the first mobility measurement signal component comprises time and frequency synchronization information.

23. The wireless device of claim 18, wherein:
the processing circuitry is further configured to perform a beam quality measurement on the CSI-RS; and
the interface is further configured to transmit the beam quality measurement to the network node.

* * * * *